United States Patent
Mondal (10) Patent No.: US 9,979,321 B2
(45) Date of Patent: May 22, 2018

(54) N-SINE WAVE INVERTER (71) Applicant: Debabrato Kumar Mondal, Novi, MI (US)

(72) Inventor: Debabrato Kumar Mondal, Novi, MI (US)

(73) Assignee: CASCO PRODUCTS CORPORATION, Wallingford, CT (US)

( * ) Notice: Subject to any disclaimer, the term of this patent is extended or adjusted under 35 U.S.C. 154(b) by 0 days. days.

(21) Appl. No.: 15/584,587

(22) Filed: May 2, 2017

(65) Prior Publication Data
US 2017/0346414 A1 Nov. 30, 2017

Related U.S. Application Data (60) Provisional application No. 62/341,227, filed on May 25, 2016.

(51) Int. Cl.
H02M 7/44 (2006.01)
H02M 7/5387 (2007.01)
(Continued)

(52) U.S. Cl.
CPC .......... *H02M 7/5387* (2013.01); *H05B 41/24* (2013.01); *H05B 41/2824* (2013.01); *Y10S 315/07* (2013.01)

(58) Field of Classification Search
CPC ........ H02M 3/28; H02M 3/315; H02M 3/335; H02M 7/515; H02M 7/53; H02M 7/537;
(Continued)

(56) References Cited

U.S. PATENT DOCUMENTS 3,652,918 A 3/1972 Marzolf
5,563,776 A 10/1996 Eck
(Continued)

FOREIGN PATENT DOCUMENTS

EP 1 811 643 A1 1/2006
WO WO 2012/116708 A2 7/2012

OTHER PUBLICATIONS

Noor Rulmuna Binti Mohd Sarmin: "Analysis and Construction of Push Pull Converter", Project Report submitted to Faculty of Electrical Engineering, Kolej Universiti Teknikal Kebangsaan Malaysia, pp. 1-27, May 2006.
(Continued)

*Primary Examiner* — Adolf Berhane
*Assistant Examiner* — Afework Demisse
(74) *Attorney, Agent, or Firm* — Ostrolenk Faber LLP (57) ABSTRACT

An inverter producing an alternating current from a direct current source has a primary stage coupled to the direct current source having a step-up transformer, a first switching circuit coupling the direct current to the transformer primary and a rectifier coupled to a secondary of the transformer for producing a DC voltage; a controller for the first switching circuit providing pulse drive signals to control switches of the first switching circuit to cause current to flow in the transformer primary and induce an alternating current in the transformer secondary; a secondary stage receiving the DC voltage having a second switching circuit and a controller for the second switching circuit for generating control signals to cause current through the second switching circuit to flow in alternate directions thorough the load. In one embodiment the alternating current period is divided into time slices and the switches of the first switching circuit are duty cycle modulated at different duty cycles in each time
(Continued)

slice. A second embodiment switches series-connected primary windings of a multi-tap transformer.

27 Claims, 7 Drawing Sheets (51) Int. Cl.
*H05B 41/282* (2006.01)
*H05B 41/24* (2006.01)

(58) Field of Classification Search
CPC ....... H02M 7/538466; H02M 7/53862; H02M 7/757; H02M 7/79
See application file for complete search history.

(56) References Cited

U.S. PATENT DOCUMENTS

| | | | |
|---|---|---|---|
| 5,633,377 A * | 5/1997 | Thurkauf | C07D 233/64 544/370 |
| 5,633,577 A * | 5/1997 | Matsumae | H02J 7/0013 320/104 |
| 5,652,699 A | 7/1997 | Kim et al. | |
| 5,684,680 A | 11/1997 | Tahhan et al. | |
| 5,757,633 A | 5/1998 | Bowles | |
| 6,049,471 A | 4/2000 | Korcharz et al. | |
| 6,556,461 B1 | 4/2003 | Khersonsky et al. | |
| 6,798,676 B2 | 9/2004 | Chen et al. | |
| 6,969,967 B2 | 11/2005 | Su | |
| 6,980,450 B2 | 12/2005 | Bhate et al. | |
| 7,626,834 B2 | 12/2009 | Chisenga et al. | |
| 8,049,362 B2 | 11/2011 | Darroman et al. | |
| 8,085,565 B2 | 12/2011 | Huang et al. | |
| 9,214,876 B2 | 12/2015 | Vinnikov et al. | |
| 9,344,009 B2 | 5/2016 | Endo | |
| 2003/0193821 A1* | 10/2003 | Krieger | H02M 3/3372 363/25 |
| 2008/0055952 A1 | 3/2008 | Chisenga et al. | |
| 2011/0298305 A1 | 12/2011 | Chisenga et al. | |
| 2015/0318796 A1 | 11/2015 | Dent | |

OTHER PUBLICATIONS

Bilal, Malik: "DC to DC Converter Using Push-Pull Topology", Aug. 1, 2014, pp. 1-13, http://microcontrollerslab.com/dc-dc-converter-using-push-pull-topology.

Bell, Bob: "Introduction to Push-Pull and Cascaded Power Converter Topologies", National Semiconductor ON-Line Seminars, pp. 1-44, Jul. 10, 2003.

Foong, Chong Wei: "AC Inverter for Automobile", Project Report submitted to SIM University School of Science and Technology, pp. 1-116, Nov. 2009.

Deepak, P. Chaithanya et al.: Cascaded H-Bridge Multilevel Inverter Using Inverted Sine Wave PWM Technique, *International Journal of Emerging Trends in Electrical and Electronics* (IJETEE-ISSN: 2320-9596), vol. 6, Issue 1, pp. 39-44, Aug. 2013.

Lai, Jih-Sheng et al.: "Multilevel Converters—A New Breed of Power Converters", *IEEE Transactions on Industry Applications*, vol. 32, No. 3, pp. 509-517, May/Jun. 1996.

Bhutada, Sudha et al.: "Single Phase PV Inverter Applying a Dual Boost Technology", *International Journal of Scientific Engineering and Technology*, vol. No. 4, Issue No. 6, pp. 356-360, ISSN: 2277-1581, Jun. 1, 2015.

European Search Report dated Nov. 2, 2017 issued in related European Application No. 17171563.4-1809.

* cited by examiner

N-SINE WAVE INVERTER

CROSS REFERENCE TO RELATED APPLICATION

This application is a non-provisional application of and claims the benefit and priority of U.S. Provisional Application No. 62/341,227, filed May 25, 2016 entitled N-SINE WAVE INVERTER, the entire disclosure of which is hereby incorporated by reference.

BACKGROUND OF THE INVENTION

The present invention is an electrical inverter for inverting direct current into alternating current. In particular, the invention is useful in an automotive environment to produce 110/230 volt alternating current at 50/60 cycles to power alternating current powered electrical devices from a vehicle's DC electrical system, for example, 12-14 volts DC/24 VDC/48 VDC.

The output of the inverter is an (NSW) alternating current output (N-Sine Wave or N-Step Sine Wave). The NSW output more closely approximates a true sine wave (TSW) than the known MSW (Modified Sine Wave) inverter that produces only positive and negative going square pulses with a period of time of zero volts in between pulses. The NSW waveform has a plurality of steps that more closely approximates a true sine wave.

It is an object of the present invention to provide an improved inverter circuit having an NSW output that more closely approximates a true sine wave, without the bulky and expensive filter, thereby to improve efficiency of inverter powered alternating current devices.

It is furthermore an object of the invention to provide a cost effective solution to the need for a DC-AC inverter circuit.

Another object of the present invention is to provide a switching inverter that is smaller and lighter than conventional TSW inverters. In automotive applications, the end user will have much more flexibility in using different loads that may not function property with traditional MSW inverter.

SUMMARY OF THE INVENTION

The invention provides advantages in that there is better and more efficient operation of the load device, decreased noise, reduced distortion and thus smoother load operation, cooler and quieter load operation and because of the use of high frequency pulse modulation, reduced weight.

The invention according to one embodiment is a two stage inverter circuit having a first stage comprising a push-pull converter that has a plurality of electronic semiconductor switches that are switched by a control circuit. The push-pull converter converts the direct current from the power source, for example, the 12/24/48 volts DC of an automobile battery, to high voltage direct current. This part of the circuit can be referred to as the primary stage circuit and includes an isolation step-up transformer as well as a control circuit that provides duty cycle modulated or pulse width modulated (PWM) control signals to the electronic switches of the push-pull converter. In a typical arrangement according to the invention, the push-pull converter has two switches that are switched complementarily, i.e. when one switch is on, the other switch is off with a dead-band in-between when both are off. Each switch provides electric current alternately to a respective portion of the primary winding of the transformer. The transformer is switched by high frequency drive signals, i.e. in a range of 33 KHz to 150 KHz, for example, so the transformer core can be minimized since heavy core iron is not necessary at these frequencies. The drive signals are preferably duty cycle modulated by varying the dead-band between when each of the transistors are on. The longer the dead-band, the lower the duty cycle and conversely, the shorter the dead-band, the higher the duty cycle. By varying the dead-band in this way, the output voltage at the transformer secondary can be varied or modulated. In particular, when the dead-band is longer and the duty cycle lower, the output voltage will be lower and conversely when the dead-band is shorter and the duty cycle greater, the output voltage at the secondary of the transformer will be greater.

In this embodiment, the invention divides the desired 50/60 Hz AC wave period into a number of time slices, in one embodiment, eight time slices per half cycle and the time slices preferably are of an unequal length to provide better approximation to a sine wave at the output. Each time-slice employs a different duty cycle, i.e., the percentage of the period when there is an on pulse. For each time slice, there is a different duty cycle. As the dead-band shortens (higher duty cycle), there is a step up in transformer output voltage and conversely when the dead-band increases (lower duty cycle), there is a drop or step down in transformer output voltage. In this way, a stepped-voltage waveform at 50-60 Hz is modulated on the waveform at the much higher KHz frequency. The alternating current output of the step-up transformer is then rectified by a half-wave or full-wave rectifier to DC and provided to the secondary stage of the circuit comprising an inverter, for example an H-bridge inverter, which forms the secondary side of the circuit. The H-bridge inverter is controlled by control signals synchronized with the control signals driving the transistors of the push-pull converter to provide a 50/60 Hz line frequency NSW alternating current at the desired output voltage, typically 110/230 volts RMS, to the load. For example, the line frequency standard in the United States is 60 Hz and the standard in Europe is 50 Hz.

Preferably, the H-bridge secondary stage is driven at 50/60 Hz on a high frequency pulse width modulated carrier, e.g., at 20 KHz to provide a smoother approximation (increased resolution) to a true sine wave at the inverter output.

Feedback is provided from the load as well as preferably from the output voltage of the primary circuit and the vehicle battery to adjust the primary stage duty cycle and frequency as necessary to maintain the NSW output voltage at the proper voltage and 50/60 Hz line frequency.

There are three embodiments of the invention. One implements the time slices in software and a second employs a more specialized multi-tap transformer and more switches without time slicing. Both preferably utilize a programmed microprocessor (up) controller. There is also a combined embodiment utilizing both techniques.

In the first embodiment, the controller for the primary side transistors of the push-pull converter are controlled by a microprocessor that implements the time slices using software. This embodiment is versatile in that it can be programmed to change the number of time-slices to more closely approximate a sine wave by programming the microprocessor.

In the second embodiment, a more complex isolation transformer with additional primary winding taps and additional switching transistors is used. In one embodiment, there are four switching transistors in the primary stage which produces the NSW output that more closely approximates a sine wave than the traditional modified sine wave circuits used in other automotive inverters. In this embodiment, varying numbers of primary winding portions are switched in or out, resulting in varying the transformer turns ratio to achieve the desired output voltage steps. The switching control signals are preferably provided by a programmed microprocessor.

In yet a third embodiment, the hardware implementation of the second embodiment with more switches and transformer primary winding taps is combined with the software implementation using the time slices of the first embodiment. This can result in an NSW output that has even more steps and thus even more closely approximates a true sine wave.

The purpose of the invention is to provide an AC output that more closely approximates a true sine wave without the bulk and complexity of a true sine wave inverter which would increase cost and require more bulky filters, e.g., LC filters, to filter the output voltage into a true sine wave. Further, the present invention, generating an NSW output, provides an output that more closely approximates a true sine wave than the known MSW output.

Accordingly, the invention comprises, in one embodiment, a 2-stage inverter that includes a primary stage push-pull DC to AC to DC converter stage followed by a secondary DC to AC inverter stage. An important feature of this embodiment of the invention is that the DC output of the push-pull DC to AC to DC converter stage is modulated with the voltage steps produced by the duty cycle controller using the time slices. Thus, the DC provided to the H-bridge secondary stage inverter is a modulated DC voltage which is then inverted to alternating current at 50/60 Hz.

According to this embodiment, the invention comprises an inverter producing an alternating current of a defined frequency and period from a direct current comprising a primary stage coupled to a source of the direct current and producing a higher voltage direct current, the primary stage comprising a step-up transformer, a first switching circuit coupling the direct current to a primary winding of the transformer and a rectifier coupled to a secondary winding of the transformer for producing a DC voltage; a controller for the first switching circuit providing drive signals to the first switching circuit to control switches of the first switching circuit to cause current to flow in the primary winding and induce an alternating current to flow in the secondary winding; further wherein the controller for the first switching circuit divides the period of the alternating current of the defined frequency and period into a preset number of time slices and within each time slice, generates duty cycle modulated drive signals for the first switching circuit having a defined duty cycle within the time slice, the duty cycle being variable from one time slice to the next time slice whereby a stepped voltage waveform is generated at the secondary winding of the transformer, and further comprising a secondary stage comprising a second switching circuit receiving the DC voltage from the rectifier and converting the DC voltage into the alternating current to power a load; and further comprising a controller for the second switching circuit for providing control signals to control switches of the second switching circuit to cause current through the second switching circuit to flow in alternate directions thorough the load; the control signals for the second switching circuit being synchronized with the drive signals for the first switching circuit to generate the alternating current of the defined frequency and period.

According to another embodiment, there is provided an inverter for producing an alternating current of a defined frequency from a direct current comprising a primary stage coupled to a source of the direct current and producing a higher voltage direct current, the primary stage comprising a step-up transformer, a first switching circuit coupling the direct current to a primary winding of the transformer and a rectifier coupled to a secondary winding of the transformer for producing a DC voltage; a controller for the first switching circuit providing drive signals to the first switching circuit to control switches of the first switching circuit to cause current to flow in the primary winding and induce an alternating current to flow in the secondary winding; and wherein said primary winding of said transformer comprises a multi-tap primary winding having respective series connected primary winding portions, the first switching circuit comprising a plurality of switches each coupled between a first pole of the direct current source and a respective terminal of the multi-tap primary winding, a center tap of the primary winding being coupled to a second pole of the direct current source, respective pairs of said plurality of switches being driven by said controller for the first switching circuit alternately whereby current from the direct current source flows alternately through one or two of said primary winding portions to induce a stepped voltage in said alternating current in said secondary winding; further comprising a secondary stage comprising a second switching circuit receiving the DC voltage from the rectifier and converting the DC voltage into the alternating current to power a load; further comprising a controller for the second switching circuit for providing control signals to control switches of the second switching circuit to cause current through the second switching circuit to flow in alternate directions thorough the load; the control signals for the second switching circuit being synchronized with the drive signals for the first switching circuit to generate the alternating current of the defined frequency.

The above described first embodiment can be combined with the second embodiment wherein the transformer comprises a multi-tap transformer having series-connected primary winding portions and a center-tap, the first switching circuit comprises a plurality of switches each coupled between one pole of the direct current source and a respective terminal of the multi-tap transformer, the center-tap of the primary winding being coupled to a second pole of the direct current source, respective pairs of said plurality of switches being driven by the controller for the first switching circuit alternately whereby current from the direct current source flows alternately through one or two of the series connected primary winding portions to induce a stepped voltage in said secondary winding.

Furthermore, a method is also provided for producing an alternating current output of a defined frequency and period from a direct current comprising switching the direct current through a primary winding of a step-up transformer with a first switching circuit and inducing an alternating current in a secondary winding of the transformer; controlling the switching of the direct current by dividing the period of the alternating current output of the defined frequency and period into a preset number of time slices and, within each time slice, generating duty cycle modulated drive signals having a defined duty cycle within each time slice, the duty cycle being variable from one time slice to the next time slice whereby a stepped voltage waveform is generated at the secondary winding of the transformer; rectifying the alternating current from the secondary winding into a DC voltage; converting the DC voltage into the alternating circuit output to power a load by switching a second switching circuit to cause current through the second switching circuit to flow in alternate directions through the load; synchronizing the switching of the second switching circuit with the switching of the first switching circuit to generate the alternating current output of the defined frequency and period.

According to a further method, the invention comprises a method for producing an alternating current output of a defined frequency from a direct current comprising switching the direct current through a primary winding of a step-up transformer with a first switching circuit and inducing an alternating current in a secondary winding of the transformer; rectifying the alternating current from the secondary winding into a DC voltage; converting the DC voltage into the alternating current output to power a load by switching a second switching circuit to cause current through the second switching circuit to flow in alternate directions through the load; synchronizing the switching of the second switching circuit with the switching of the first switching circuit to generate the alternating current output of the defined frequency; wherein said step of switching the direct current through the primary winding comprises providing a transformer having a multi-tap primary winding having respective series-connected primary winding portions, connecting a plurality of switches each coupled between a first pole of a direct current source and a respective terminal of the multi-tap primary winding, coupling a center-tap of the primary winding to a second pole of the direct current source, driving respective pairs of said plurality of switches alternately whereby current from the direct current source flows alternately through one or two of said series-connected primary winding portions to induce a stepped voltage in said secondary winding, and wherein said stepped voltage is caused by a change in turns ratio of the transformer in accordance with whether current flows through one or two of said series-connected primary winding portions.

BRIEF DESCRIPTION OF THE DRAWING(S)

The invention will now be described in greater detail in the following detailed description with reference to the drawings in which.

Other objects, features and advantages of the invention will be apparent from the detailed description which follows.

DETAILED DESCRIPTION OF EMBODIMENTS OF THE INVENTION

Figure 1:
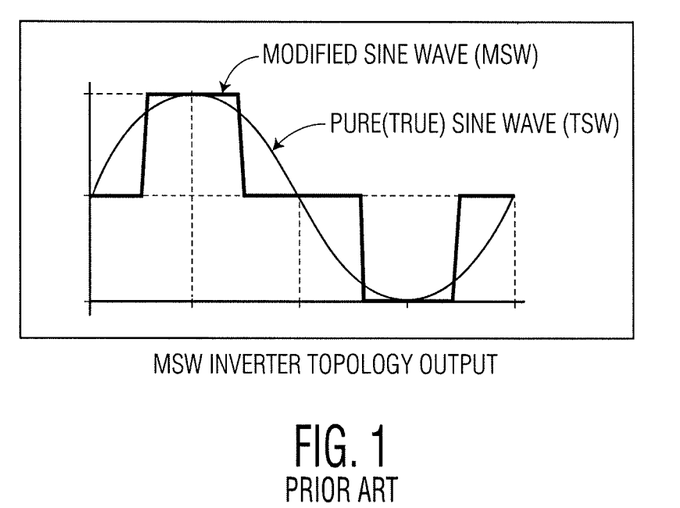
FIG. 1 shows the prior art MSW (modified sine wave) inverter output compared to a pure or true sine wave (TSW) output.

With reference to the drawings, FIG. 1 shows the prior art MSW or modified sine wave inverter topology output. As shown, the output is a simple square wave with positive and negative going pulses. Each of the pulses roughly approximate each half cycle of a sine wave. There is a period of time between the positive and negative going pulses where the voltage is zero. Because of the rough approximation to a true sine wave, this type of inverter output often causes inefficiencies in alternating current powered loads including heat generation, noise, generation of harmonics and for some loads, failure to start or to run.

Figure 2:
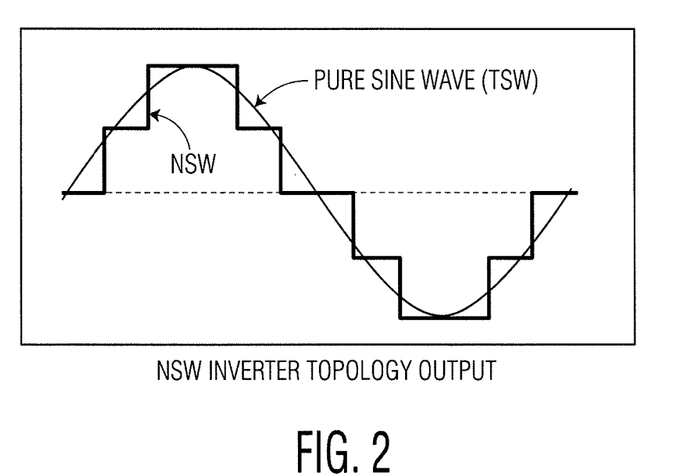
FIG. 2 shows an example of an NSW output compared to the pure sine wave.

FIG. 2 shows a simple example of an NSW inverter topology output having two steps each quarter cycle. As shown, the output is a step function that more closely approximates a pure sine wave. Because the output more closely resembles a sine wave, the NSW waveform provides less distortion, better efficiency, cooler operation of the load and decreased noise. By employing more steps, an even better approximation of a time sine wave can be achieved.

According to a first embodiment of the invention, a controller, preferably a microprocessor, divides each half wave of the desired AC waveform at the desired output line frequency of 50 or 60 Hz (or whatever output frequency is desired) into a plurality of distinct time slices, preferably of unequal duration or length. According to one embodiment as described herein, each half cycle is divided into eight distinct time slices with four time slices in each quarter cycle being of unequal length. In each time slice, the switches of a primary stage inverter are duty cycle modulated at a defined duty cycle set by a dead-band delay between the on-times of the complementary driven switches. In each new time slice, the dead-band is changed, thus changing the duty cycle in such a way as to provide a step function approximation of a true sine wave. Thus, when the (absolute value) AC output is to increase, the dead-bands are decreased when a new time slice occurs and when the AC output (absolute value) is to decrease, the dead-bands decrease when a new time slice occurs. The time slices are preferably of unequal length to better approximate the desired sine wave output. For example, at the beginning of an AC half cycle after the zero crossing, the absolute value slope of the sine wave is greater than near the peak of the half cycle and accordingly, the time slices are of a shorter length at the beginning than they are near the peak of the half cycle. Similarly, at the end of the half cycle approaching the zero crossing, the time slices are shortened in duration or length to approximate the greater (absolute value) slope of the desired sine wave output.

Figure 3:
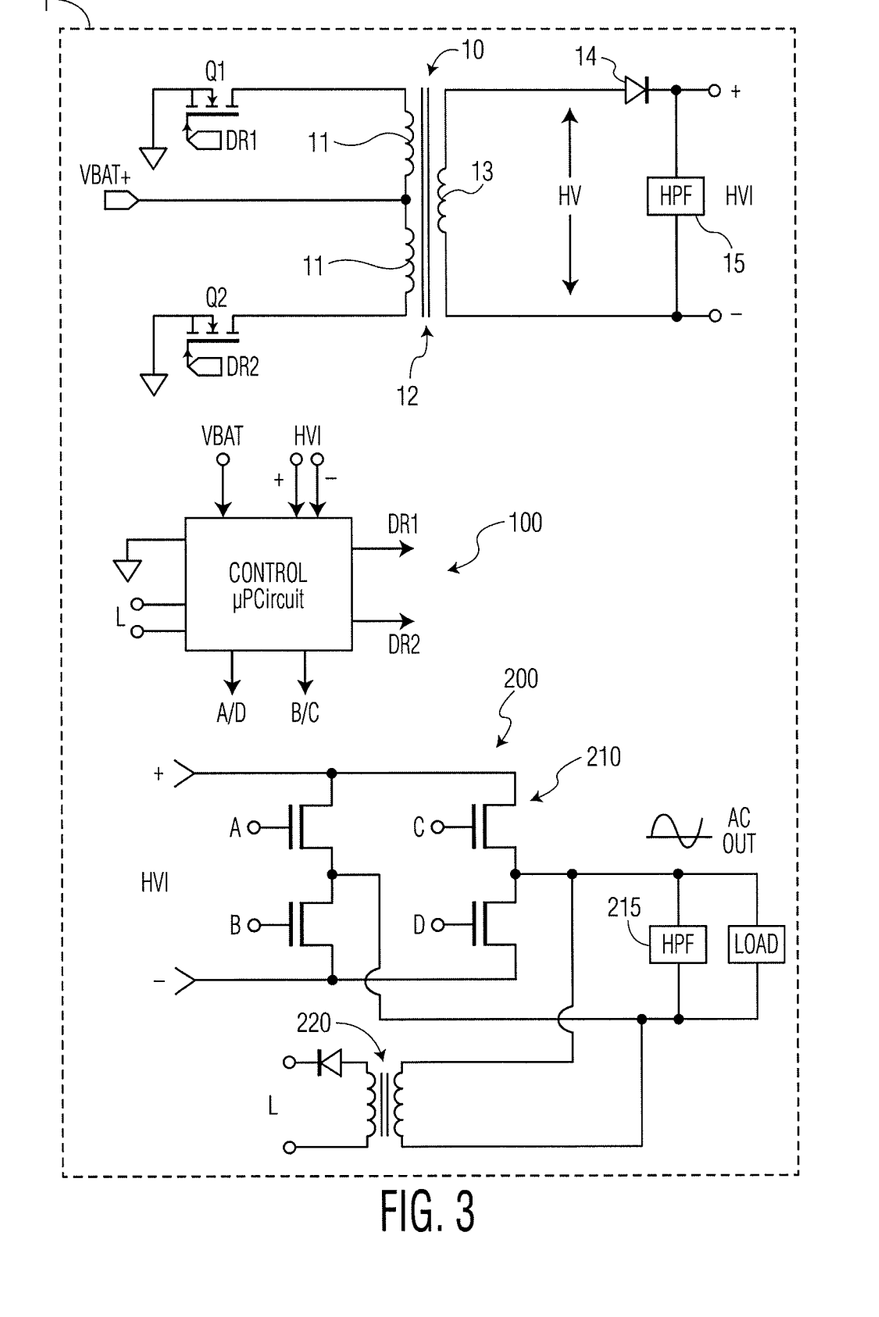
FIG. 3 is a block/schematic diagram of the NSW inverter of a first embodiment of the present invention showing the primary stage converter, the controller for controlling both the primary stage and the secondary stage, and the secondary stage inverter.

Turning to FIG. 3, the invention will now be described with reference to an exemplary embodiment. The inverter 1 according to this embodiment has a primary stage 10, a controller 100 and a secondary stage 200. The primary stage 10 comprises a DC to AC to DC converter. The input voltage, for example, the battery voltage or vehicle electrical system voltage VBAT is provided to the primary stage 10 comprising a push-pull converter having two switching transistors Q1 and Q2, e.g., FETs, driven by drive signals DR1 and DR2 from the controller 100. The push-pull converter includes a step-up isolation transformer 12 having a primary winding 11 with a center-tap to which the source voltage VBAT+ is provided. The primary winding outer terminals are connected to the drains of transistors Q1 and Q2. The negative side of the source voltage VBAT is provided as shown to the sources of the switching transistors Q1 and Q2. The gates of the transistors Q1 and Q2 are switched complementarily as shown by the drive signals DR1 and DR2 in FIG. 4A. The drive signal frequency is preferably in the range of 33 to 150 KHz and accordingly, the transformer 12 can be relatively small and does not require a significant iron core at these frequencies. The drive signals are divided into a plurality of time slices wherein the duty cycles vary between time slices, as described above and below in greater detail. The output of the secondary winding 13 of transformer 12 is thus a step modulated high voltage alternating current at the pulse frequency (FIG. 4B) which is provided to a rectifier, in this case, a half-wave rectifier 14, thus providing the modulated DC output HV1 of FIG. 4C. Instead of a half-wave rectifier as shown in FIG. 3, a full wave rectifier can be employed.

The modulated DC output HV1 is provided to the secondary stage 200 of the inverter (bottom of FIG. 3), which in the embodiment shown comprises an H-bridge inverter 210 whose output provides the AC signal at 110/230 volts 50/60 Hz line frequency to the load. See FIG. 4D.

In particular, the H-bridge 210 comprises four switching transistors driven by control signals A and D and B and C from the controller 100. The control signals driving the H-bridge 210 are synchronized with the drive signals DR1 and DR2 in the primary stage so that the desired output frequency (50/60 Hz) is generated at the load.

More particularly, FIG. 4 (comprising FIGS. 4A-4D) shows the waveforms in the circuit of FIG. 3. The signals DR1 and DR2 are not drawn to the same time scale as the waveforms in FIG. 4 parts B, C and D. Signals DR1 and DR2 have a frequency at the pulse frequency, e.g. 33 to 150 KHz, whereas graphs B, C and D of FIG. 4 show the step waveforms at the line frequency (50/60 KHz) modulated on the pulse carrier frequency.

Figure 4A:
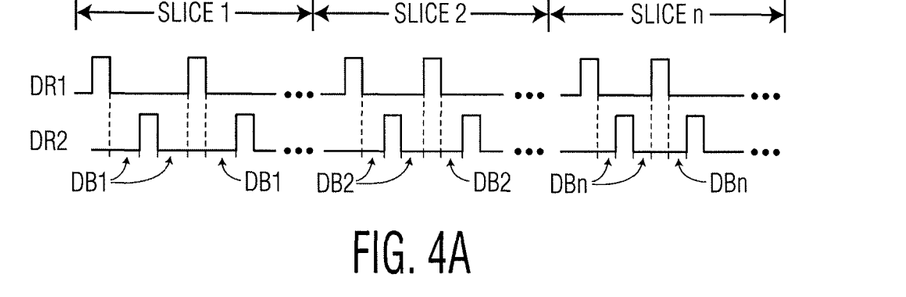
FIGS. 4A, 4B, 4C and 4D show exemplary waveforms in the circuit of FIG. 3 with the waveforms of FIG. 4A not being to the same time scale as those of FIGS. 4B, 4C and 4D.

Drive signals DR1 and DR2 are complementary drive signals fed to the gates of respective transistors Q1 and Q2 of the primary stage. FIG. 4A only shows two pulses in each of three different time slices of the desired AC output frequency of 50/60 Hz. In an embodiment, there are eight time slices per half cycle. As shown in the first time slice (at the beginning of a half cycle near the zero crossing), the duty cycle is relatively low with a relatively large dead-band DB1 between when complementary pulses DR1 and DR2 are on. In this time slice, transistors Q1 and Q2 are alternately driven on at the pulse frequency to cause currents to flow in alternate winding portions of the primary winding 11 of transformer 12, thus generating an alternating current output voltage HV at the pulse frequency at the secondary winding. Since the duty cycle in this time slice is low as set by the dead-band, the output voltage HV at the pulse frequency is relatively low.

In the next time slice, shown to the right of the first time slice, dead-band DB2 between pulses DR1 and DR2 is less and accordingly the duty cycle is greater, thus leading to a higher stepped-up secondary voltage HV at the pulse frequency for the next time slice. In each time slice leading to the peak of the desired AC waveform, the dead-band is decreased (duty cycle increased) thus generating voltage step ups each time there is a new time slice in the secondary voltage HV. After the peak, when the absolute value of the desired AC waveform is decreasing, in each time slice the dead-band is then increased until the zero crossing, resulting in a voltage step down function that decreases to approximate the desired sine wave output.

Figure 4B:
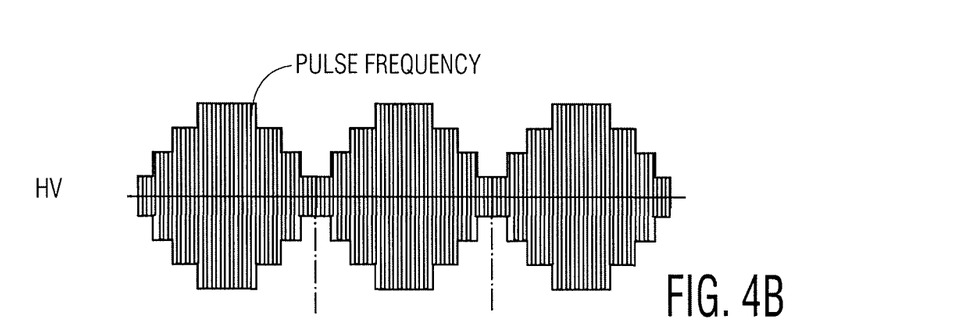
Figure 4C:
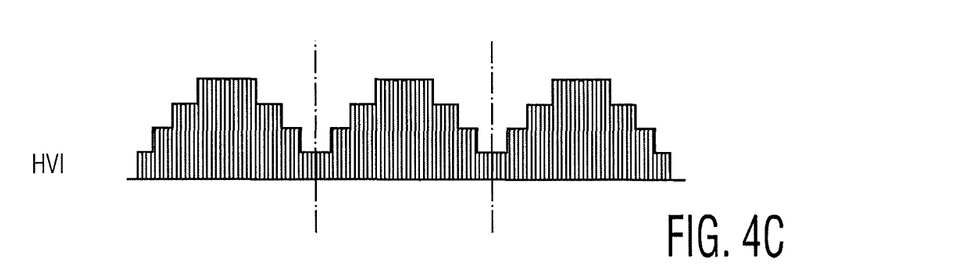
Figure 4D:
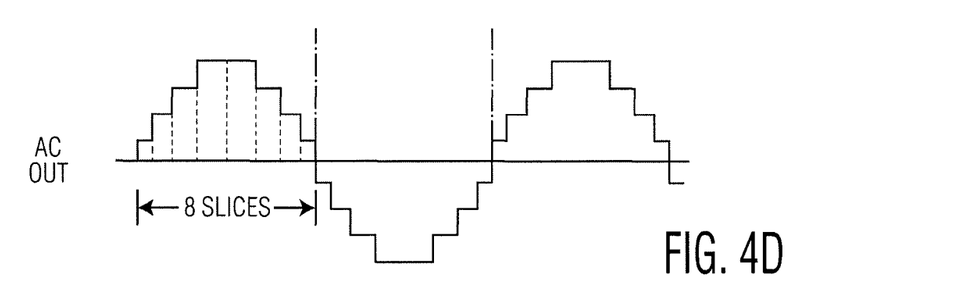

This is shown in FIG. 4B. The pulse high frequency signal (carrier frequency) is thus modulated with the desired step function simulating the envelope of a sine wave. After rectification by the rectifier 14, the modulated DC voltage HV1 is as shown in FIG. 4C. The DC voltage HV1 is provided to the secondary stage inverter 200. Switches A, B, C and D are controlled by controller 100 synchronized with the signals DR1 and DR2 of the primary stage to generate the AC output voltage shown in FIG. 4D. The pulse carrier frequency is not shown in FIG. 4D. It can be filtered out by optional high pass filter 15 (FIG. 3) if desired, but for most applications, the pulse frequency is transparent to operation of the load.

In the described embodiment, the dead-band between the complementary driven pulses DR1 and DR2 is modulated to vary the duty cycle. The pulse width is held constant. Accordingly, the duty cycle and thus the pulse frequency change between time slices.

Other methods could be employed. For example, instead of varying the dead-band to change the duty cycle, the pulse width could be modulated at constant frequency (PWM), which would thus modulate the duty cycle and dead-band.

The H-bridge 210 of the secondary stage is switched so that the alternate half cycles flow through the load as an alternating current.

Accordingly, switches A and D of H-bridge 210 are turned on at the same time by the controller to allow current to flow through the load in one direction and then switches B and C are turned on at the same time to allow current to flow through the load in the reverse direction. The switching is thereafter repeated. The H-bridge switching frequency is controlled by controller 100 to be either 50 Hz or 60 Hz, as required.

Figure 5:
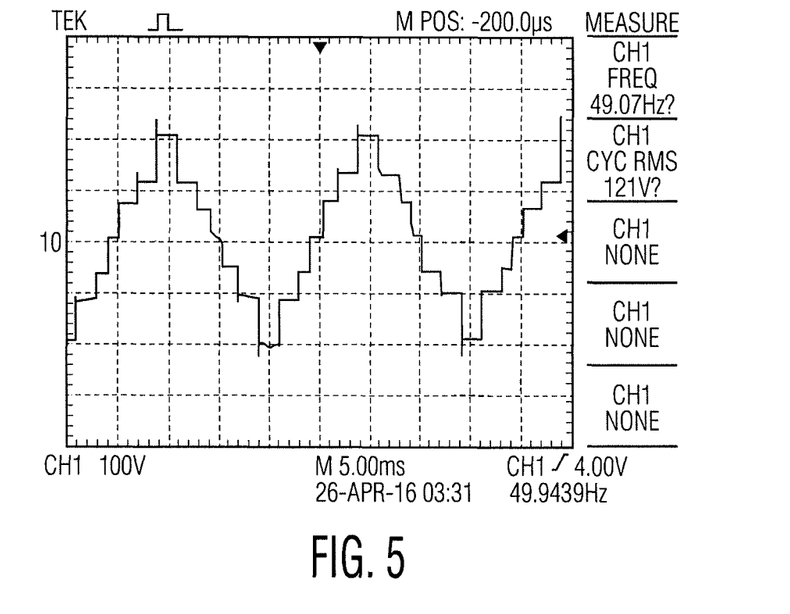
FIG. 5 shows an actual output waveform of an inverter according to the first embodiment of the present invention.
Figure 5A:
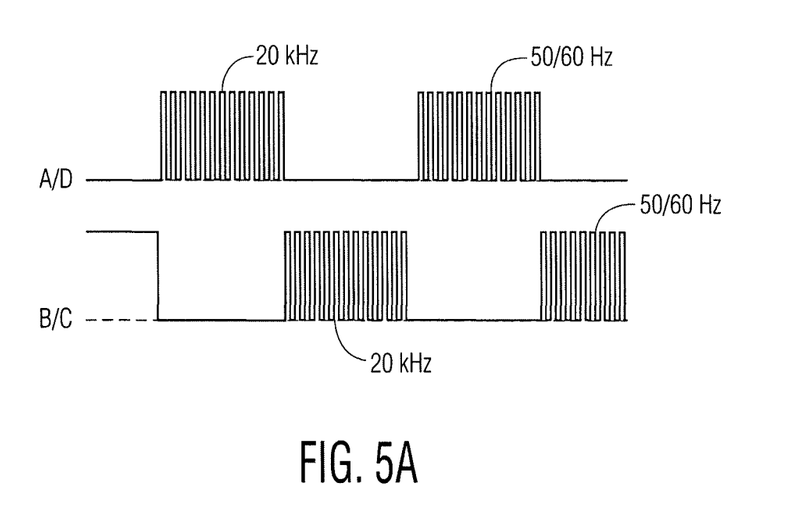
FIG. 5A shows a preferred embodiment of the control signals for the secondary stage inverter.

In a preferred embodiment, as shown in FIG. 5A, the primary switching frequency of 50/60 Hz for the H-bridge is modulated on a high frequency carrier, for example, 20 KHz, and with varying duty cycle to generate the N steps with increased resolution and signal smoothing, thus better approximating a sine wave. So, in FIG. 5A, the 50/60 Hz switching frequency is modulated onto the high frequency carrier. The duty cycle of the carrier is preferably modulated so that at the beginning of the half cycle, the duty cycle is lowest and increases toward the half cycle peak. The 20 KHz carrier frequency may be removed by an appropriate filter, e.g., HPF 215 in FIG. 3.

As shown in FIG. 4 (comprising FIGS. 4A-4D), in the embodiment of FIG. 3, each half cycle has eight time slices resulting in eight steps in the generated NSW sine wave output per half cycle.

FIG. 5 shows an actual output of an inverter according to the present invention powering a 150 W load and with a 12V DC input. Preferably, as shown, the time slices are of unequal length to better approximate a true sine wave. Thus, at the beginning (zero crossing) of the half cycle, the time slices are of shorter duration to approximate the higher absolute value slope of the sine wave at the beginning of a half cycle and the time slices increase in duration toward the peak of the sine wave as shown in FIG. 5 and then decrease after the peak to the next zero crossing.

Preferably the controller 100 comprises a microprocessor that is programmed with software to provide the time slices in each half cycle of the desired alternating current output frequency. According to one embodiment, the controller generates a free running 1 msec timing signal. A micro-timer with a period of 1 msec divides the full time period (20/16.67 msec) of the 50/60 Hz AC waveform into a plurality of distinct time slices, e.g., 8 slices of unequal length in each half cycle. In each time slice, the duty cycle of the pulse frequency is modified by changing the dead-band delay, as described above. Each change in duty cycle results in a step in the secondary winding high voltage output. The duty cycle and frequency are periodically calculated based on the high voltage output, the battery voltage and load output.

As shown in FIG. 3, the controller 100 receives feedback from the output of the inverter, for example, via a feedback transformer 220 which provides feedback voltage L to the controller proportional to the output load voltage to regulate the AC output voltage, both with respect to voltage and frequency. In addition, the controller 100 preferably senses the battery voltage VBAT level as well as the DC high voltage HV1 level to operate the inverter at the necessary duty cycle and frequency to maintain the desired AC output voltage and frequency to the load.

Thus, the invention provides a DC-AC inverter for generating 110/230V AC at 50/60 Hz from an input DC voltage (e.g. 12V DC), with the AC output being a more accurate simulation of a true sine wave. It generates such an output without requiring bulky LC filters as needed for true sine wave inverters and provides for smoother, more efficient load operation than known MSW inverters.

Figure 6:
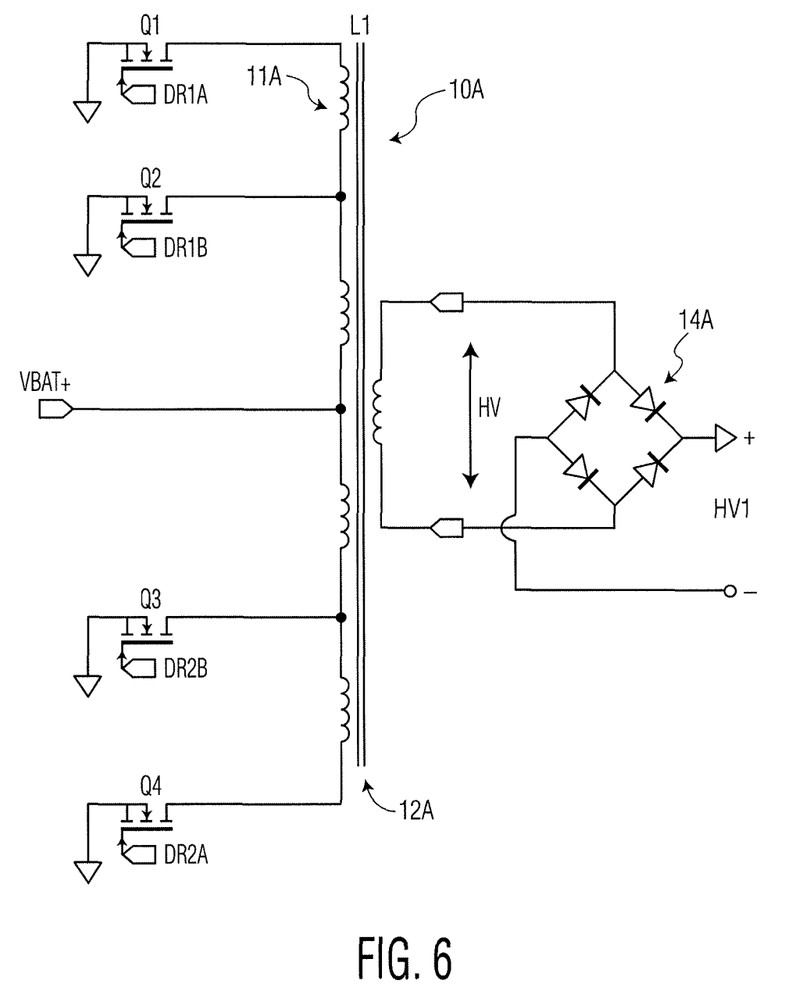
FIG. 6 shows an embodiment of the primary stage according to a second embodiment of the present invention wherein the high voltage output is generated by appropriate switching of four primary stage transistors.

According to a second embodiment of the invention, the primary stage 10A shown in FIG. 6 of the inverter employs a step-up isolation transformer 12A operating at the line frequency having a multiple tapped primary winding. As shown in FIG. 6, the primary stage comprises a transformer 12A having a primary winding 11A with multiple taps. The battery positive voltage VBAT is provided to the center tap and each of the remaining taps and the outer terminals of the transformer are connected through a switching transistor (FET) to the battery ground terminal. The controller switches transistors Q1 and Q2 followed by transistors Q3 and Q4 in the sequence described below.

Figure 7A:
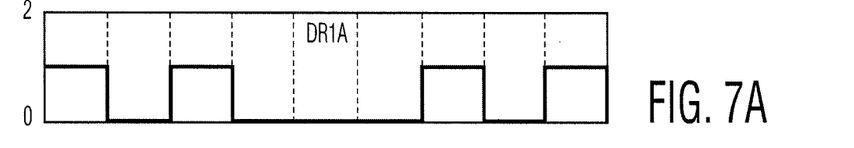
FIGS. 7A, 7B, 7C, 7D, 7E, 7F and 7G show the waveforms driving the switching transistors of FIG. 6 as well as the primary stage high voltage AC output HV and DC output HV1 produced after rectification of the signal HV of FIG. 6 as well as the NSW AC output.
Figure 7B:
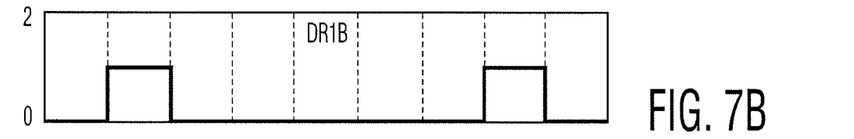
Figure 7C:
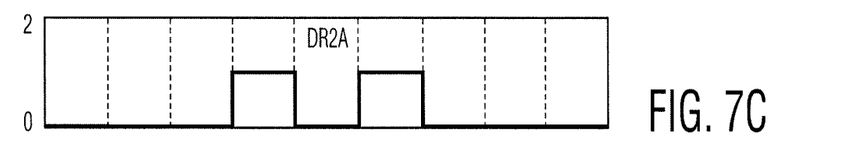
Figure 7D:
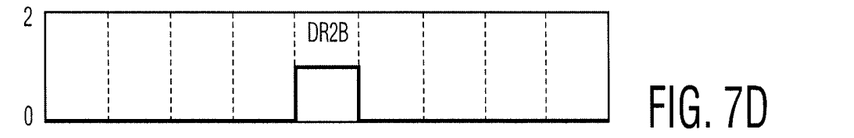
Figure 7E:
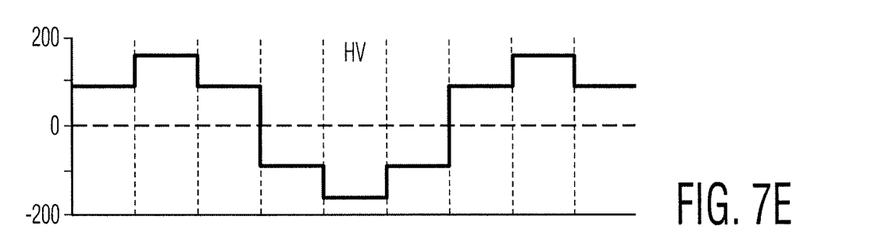
Figure 7F:
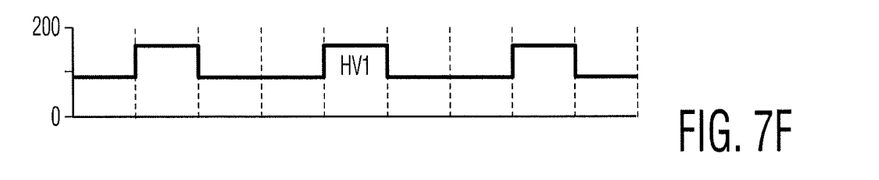
Figure 7G:
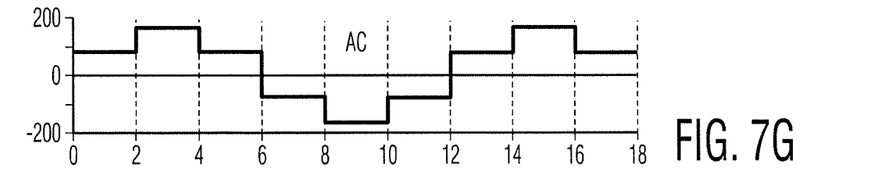

First, transistor Q1 is turned on. Current flows through two winding portions of the primary winding 11A from the battery to ground through the transistor Q1. Then transistor Q1 is turned off and transistor Q2 is turned on and battery voltage flows through only one portion of the primary winding to ground through the transistor Q2. Then transistor Q2 is turned off and transistor Q1 is turned back on and then off. Because the turns ratio (secondary to primary) is greater when current flows through transistor Q2, a higher voltage is generated at the DC output HV1 as shown in FIG. 7E than when transistor Q1 is turned on and current flows through two portions of the primary winding with a lower turns ratio from secondary to primary. After transistors Q1 and Q2 are turned on and off in the same sequence as shown, then transistors Q4 and Q3 are likewise turned on and off as shown in FIGS. 7C and 7D. The described switching sequence is repeated. This results in a high voltage AC waveform HV at the transformer secondary winding output as shown in FIG. 7E and the high voltage DC waveform HV1 after rectification by full-wave rectifier 14A as shown in FIG. 7F. After operation of the H-bridge inverter, the AC NSW output is shown in FIG. 7G.

If more transistor switches are added and the primary winding of the transformer includes an even larger number of taps, more steps can be provided in the NSW AC output waveform.

As shown in FIG. 7, according to an embodiment of the invention, when transistor Q1 turns on, approximately 90 volts is generated at HV1. When Q1 turns off and Q2 turns on, about 160 volts is generated on HV1. Then Q2 turns off and Q1 turns on again generating about 90 volts on HV1. Q1 and Q2 thus generate the voltage shape of the sine wave for the positive half cycle.

Then Q4 turns on generating about 90 volts on HV1, Q4 turns off and Q3 turns on generating about 160 volts on HV1. Q3 turns off and Q4 turns on again generating about 90 volts on HV1. Q3 and Q4 thus generate the voltage shape of the sine wave for the negative half cycle. As should be clear, 160 volts is approximately the peak voltage for a 110V RMS AC waveform.

In this embodiment, the drive signals for the primary stage switches are provided by the controller 100, e.g. a microprocessor suitably programmed. In this embodiment, pulse width or duty cycle modulation at a high carrier frequency in the kilohertz range is not employed. Instead, the PWM is in the range of the line frequency. However, as will be described below, this embodiment employing multiple transformer primary winding taps connected each to a switching transistor can be combined with the first embodiment employing time slices and high frequency duty cycle modulation to provide an even more accurate simulation of a true sine wave output.

Figure 8:
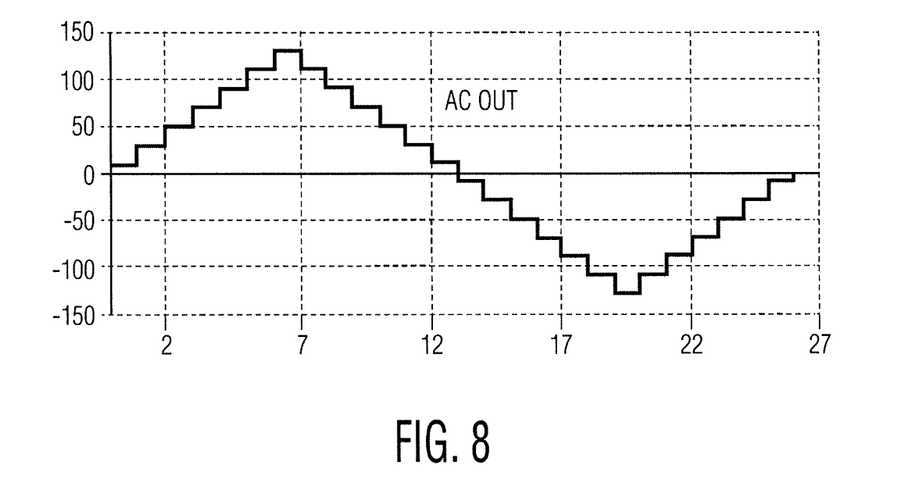
FIG. 8 shows an NSW output that can be obtained by combining features of the first embodiment shown in FIG. 3 together with the second embodiment shown in FIG. 6.

FIG. 8 shows an example of an AC NSW output which can be produced by adding more switches and additional taps to the primary winding of the transformer. In particular, 16 switches and corresponding transformer primary taps and outer primary winding terminals are employed in this embodiment to achieve the shown AC output waveform.

Alternatively, the waveform of FIG. 8 can be generated by a combination of the software algorithm implemented by the controller 100 in the embodiment of FIG. 3 as well as by implementing the primary stage circuit including the four switches and isolation transformer of FIG. 6. In particular, the waveform shown in FIG. 8 can be generated by employing the primary stage circuit shown in FIG. 6 together with the time slice and high frequency pulse width/duty cycle modulation technology of the first embodiment. Thus, the drive signals of FIG. 7 would be modulated at the pulse carrier frequency with dead-band modulation from time slice to time slice as in the first embodiment to provide a series of steps in each step of the waveform of FIG. 7G, thus doubling the number of steps in each half cycle compared to the number of steps in the waveform of FIG. 5.

Accordingly, in such an embodiment, transistor Q1 of FIG. 6 is first enabled while it is duty cycle modulated in a plurality of time slices as described above. This will generate a series of steps corresponding to each change in duty cycle. Then transistor Q1 is turned off and transistor Q2 turned on while it is duty cycle modulated, resulting in a series of increased voltage steps. Then transistor Q2 is turned off and Q1 turned back on and then off while being duty cycle modulated. This will generate the positive half cycle wave shape.

Then transistors Q4 and Q3 are similarly turned on and off while being duty cycle modulated, leading to the wave shape to generate, after inversion by the H-bridge, the negative half cycle. The sequence is then repeated.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An inverter producing an alternating current output of a defined frequency and period from a direct current comprising:
   a primary stage coupled to a source of the direct current and producing a higher voltage direct current, the primary stage comprising a step-up transformer having a primary winding and a secondary winding, a first switching circuit coupling the direct current to the primary winding of the transformer and a rectifier coupled to the secondary winding of the transformer for producing a DC voltage;
   a controller for the first switching circuit providing drive signals to the first switching circuit to control switches of the first switching circuit to cause current to flow in the primary winding and induce an alternating current to flow in the secondary winding;
   further wherein the controller for the first switching circuit divides the period of the alternating current of the defined frequency and period into a preset number of time slices and, within each time slice, generates said drive signals for the first switching circuit as duty cycle modulated drive signals having a defined duty cycle within each time slice, the duty cycle being variable from one time slice to the next time slice whereby a stepped voltage waveform is generated at the secondary winding of the transformer;
   further comprising a secondary stage comprising a second switching circuit receiving the DC voltage from the rectifier, and converting the DC voltage into the alternating current output to power a load;
   further comprising a controller for the second switching circuit for providing control signals to control switches of the second switching circuit to cause current through the second switching circuit to flow in alternate directions thorough the load;
   the control signals for the second switching circuit being synchronized with the drive signals for the first switching circuit to generate the alternating current output of the defined frequency and period.

2. The inverter of claim 1, wherein the time slices are of unequal duration in each quarter cycle of the alternating current output.

3. The inverter of claim 1, wherein the rectifier comprises either a half-wave rectifier or a full-wave rectifier.

4. The inverter of claim 1, wherein the transformer comprises a multi-tap transformer having series-connected primary winding portions and a center-tap, said first switching circuit comprises a plurality of switches each coupled between one pole of the direct current source and a respective terminal of the multi-tap transformer, the center-tap of the primary winding being coupled to a second pole of the direct current source, respective pairs of said plurality of switches being driven by said controller for the first switching circuit alternately whereby current from the direct current source flows alternately through one or two of said series-connected primary winding portions to induce a stepped voltage in said secondary winding.

5. The inverter of claim 4, wherein said stepped voltage is caused by a change in turns ratio of the transformer in accordance with whether current flows through one or two of said series-connected primary winding portions.

6. An inverter producing an alternating current output of a defined frequency and period from a direct current comprising:
   a primary stage coupled to a source of the direct current and producing a higher voltage direct current, the primary stage comprising a step-up transformer having a primary winding and a secondary winding, a first switching circuit coupling the direct current to the primary winding of the transformer and a rectifier coupled to the secondary winding of the transformer for producing a DC voltage;
   a controller for the first switching circuit providing drive signals to the first switching circuit to control switches of the first switching circuit to cause current to flow in the primary winding and induce an alternating current to flow in the secondary winding;
   further wherein the controller for the first switching circuit divides the period of the alternating current of the defined frequency and period into a preset number of time slices and, within each time slice, generates said drive signals for the first switching circuit as duty cycle modulated drive signals having a defined duty cycle within each time slice, the duty cycle being variable from one time slice to the next time slice whereby a stepped voltage waveform is generated at the secondary winding of the transformer;
   further comprising a secondary stage comprising a second switching circuit receiving the DC voltage from the rectifier, and converting the DC voltage into the alternating current output to power a load;
   further comprising a controller for the second switching circuit for providing control signals to control switches of the second switching circuit to cause current through the second switching circuit to flow in alternate directions thorough the load;
   the control signals for the second switching circuit being synchronized with the drive signals for the first switching circuit to generate the alternating current output of the defined frequency and period;
   further wherein the primary stage comprises a push-pull converter, the first switching circuit comprises first and second switches each coupled between one pole of the direct current source and opposite terminals of the primary winding, the primary winding having a center-tap coupled to a second pole of the direct current source, the first and second switches being driven by said drive signals in a complementary manner whereby only one switch is on at the same time with a dead-band between on-times of the switches when both switches are off; the controller for the first switching circuit controlling the dead-band within each time slice whereby the dead-band is constant within each time slice thereby developing a defined voltage magnitude at the secondary of the transformer for each time slice.

7. The inverter of claim 6, wherein the dead-band varies between time slices.

8. The inverter of claim 6, further comprising a filter for removing a pulse frequency of the duty cycle modulated drive signals from the DC voltage from the rectifier.

9. The inverter of claim 6, wherein the second switching circuit comprises an H-Bridge.

10. The inverter of claim 9, wherein the control signals for the second switching circuit have a primary switching frequency at the defined frequency modulated onto a carrier frequency.

11. The inverter of claim 10, wherein the defined frequency is 50 or 60 Hz and the carrier frequency of the control signals for the second switching circuit is about 20 KHz.

12. The inverter of claim 6, wherein a pulse frequency of the duty cycle modulated control signals ranges from 33 to 150 KHz and the defined frequency is 50 or 60 Hz.

13. The inverter of claim 6, further comprising a first feedback signal provided to the controller for the first switching circuit from the alternating current output.

14. The inverter of claim 6, further comprising a second feedback signal provided to the controller for the first switching circuit from the source of direct current.

15. The inverter of claim 6, further comprising a third feedback signal provided to the controller for the first switching circuit from the DC voltage from the rectifier.

16. An inverter producing an alternating current output of a defined frequency from a direct current comprising:
   a primary stage coupled to a source of the direct current and producing a higher voltage direct current, the primary stage comprising a step-up transformer, a first switching circuit coupling the direct current to a primary winding of the transformer and a rectifier coupled to a secondary winding of the transformer for producing a DC voltage;
   a controller for the first switching circuit providing drive signals to the first switching circuit to control switches of the first switching circuit to cause current to flow in the primary winding and induce an alternating current to flow in the secondary winding;
   wherein said primary winding of said transformer comprises a multi-tap primary winding having respective series-connected primary winding portions, the first switching circuit comprising a plurality of switches each coupled between a first pole of the direct current source and a respective terminal of the multi-tap primary winding, a center-tap of the primary winding being coupled to a second pole of the direct current source, respective pairs of said plurality of switches being driven by said controller for the first switching circuit alternately whereby current from the direct current source flows alternately through one or two of said series-connected primary winding portions to induce a stepped voltage in said secondary winding, and wherein said stepped voltage is caused by a change in turns ratio of the transformer in accordance with whether current flows through one or two of said series-connected primary winding portions;
   further comprising a secondary stage comprising a second switching circuit receiving the DC voltage from the rectifier and converting the DC voltage into the alternating current output to power a load;
   further comprising a controller for the second switching circuit for providing control signals to control switches of the second switching circuit to cause current through the second switching circuit to flow in alternate directions thorough the load;
   the control signals for the second switching circuit being synchronized with the drive signals for the first witching circuit to generate the alternating current output of the defined frequency.

17. The inverter of claim 16, wherein said plurality of switches comprises four switches arranged in pairs whereby one pair of switches allows current to flow through one or two of said series-connected primary winding portions to generate a waveform corresponding to a positive half-cycle of said alternating current output and a second pair of switches allows current to flow through a different one or two of said series-connected primary winding portions to generate a waveform corresponding to a negative half-cycle of said alternating current output.

18. The inverter of claim 17, wherein a first of said four switches in a first pair of said switches is turned on to cause current to flow through two series-connected primary winding portions, then a second of said switches in the first pair is turned on while the first switch is turned off to cause current to flow only in one of said series-connected primary winding portions, then the first of said switches is turned on while the second switch is turned off to cause current to flow in two of said series-connected primary winding portions, followed by controlling first and second switches in a second pair of said switches connected to two different series-connected primary winding portions in a similar sequence as the switches in the first pair.

19. A method for producing an alternating current output of a defined frequency and period from a direct current comprising:
   switching the direct current through a primary winding of a step-up transformer with a first switching circuit and inducing an alternating current in a secondary winding of the transformer;
   controlling the switching of the direct current by dividing the period of the alternating current output of the defined frequency and period into a preset number of time slices and, within each time slice, generating duty cycle modulated drive signals having a defined duty cycle within each time slice, the duty cycle being variable from one time slice to the next time slice whereby a stepped voltage alternating current waveform is generated at the secondary winding of the transformer;
   rectifying the stepped voltage alternating current waveform from the secondary winding into a DC voltage;
   converting the DC voltage into the alternating current output to power a load by switching a second switching circuit to cause current through the second switching circuit to flow in alternate directions through the load;
   synchronizing the switching of the second switching circuit with the switching of the first switching circuit to generate the alternating current output of the defined frequency and period.

20. The method of claim 19, further comprising switching the second switching circuit with control signals having a primary switching frequency at the defined frequency modulated onto a higher frequency carrier frequency.

21. The method of claim 20, further comprising duty cycle modulating the carrier frequency.

22. The method of claim 19, further comprising providing the transformer as a multi-tap transformer having series-connected primary winding portions and a center-tap, providing said first switching circuit with at least four switches each coupled between one pole of the direct current source and a respective terminal of the multi-tap transformer, the center-tap of the primary winding being coupled to a second pole of the direct current source, controlling respective pairs of said at least four switches alternately whereby current from the direct current source flows alternately through one or two of said series-connected primary winding portions to induce a stepped voltage in said secondary winding.

23. A method for producing an alternating current output of a defined frequency and period from a direct current comprising:
   switching the direct current through a primary winding of a step-up transformer with a first switching circuit and inducing an alternating current in a secondary winding of the transformer;
   controlling the switching of the direct current by dividing the period of the alternating current output of the defined frequency and period into a preset number of time slices and, within each time slice, generating duty cycle modulated drive signals having a defined duty cycle within each time slice, the duty cycle being variable from one time slice to the next time slice whereby a stepped voltage alternating current waveform is generated at the secondary winding of the transformer;

rectifying the stepped voltage alternating current waveform from the secondary winding into a DC voltage;

converting the DC voltage into the alternating current output to power a load by switching a second switching circuit to cause current through the second switching circuit to flow in alternate directions through the load;

synchronizing the switching of the second switching circuit with the switching of the first switching circuit to generate the alternating current output of the defined frequency and period;

further comprising providing said duty cycle modulated drive signals as complementary duty cycle modulated drive signals with a dead-band between pulses of said complementary drive signals and changing the dead-band to vary said duty cycle.

24. The method of claim 23, further comprising varying the time duration of said time slices within the defined period.

25. A method for producing an alternating current output of a defined frequency from a direct current comprising:

switching the direct current through a primary winding of a step-up transformer with a first switching circuit and inducing an alternating current in a secondary winding of the transformer;

rectifying the alternating current from the secondary winding into a DC voltage;

converting the DC voltage into the alternating current output to power a load by switching a second switching circuit to cause current through the second switching circuit to flow in alternate directions through the load;

synchronizing the switching of the second switching current with the switching of the first switching circuit to generate the alternating current output of the defined frequency;

wherein said step of switching the direct current through the primary winding comprises providing a transformer having a multi-tap primary winding having respective series-connected primary winding portions, connecting a plurality of switches each coupled between a first pole of a direct current source and a respective terminal of the multi-tap primary winding, coupling a center-tap of the primary winding to a second pole of the direct current source, driving respective pairs of said plurality of switches alternately whereby current from the direct current source flows alternately through one or two of said series-connected primary winding portions to induce a stepped voltage in said secondary winding, and wherein said stepped voltage is caused by a change in turns ratio of the transformer in accordance with whether current flows through one or two of said series-connected primary winding portions.

26. The method of claim 25, further comprising switching said plurality of switches in pairs whereby one pair of switches allows current to flow through one or two of said series-connected primary winding portions to generate a waveform corresponding to a positive half-cycle of said alternating current output and a second pair of switches allows current to flow through a different one or two of said series-connected primary winding portions to generate a waveform corresponding to a negative half-cycle of said alternating current output.

27. The method of claim 26, further comprising switching a first of said four switches in a first pair of said switches on to cause current to flow through two series-connected primary winding portions, then switching on a second of said switches in the first pair while turning off the first switch to cause current to flow only in one of said series-connected primary winding portions, then switching on the first of said switches while turning off the second switch to cause current to flow in two of said series-connected primary winding portions, followed by controlling first and second switches in a second pair of said switches connected to two different series-connected primary winding portions in a similar sequence as the switches in the first pair.

* * * * *